United States Patent
Visani et al.

(10) Patent No.: US 7,856,123 B2
(45) Date of Patent: Dec. 21, 2010

(54) METHOD FOR RECOGNISING FACES BY MEANS OF A TWO-DIMENSIONAL LINEAR DISCRIMINANT ANALYSIS

(75) Inventors: Muriel Visani, La Rochelle (FR); Christophe Garcia, Rennes (FR); Christophe Laurent, Vignoc (FR)

(73) Assignee: France Telecom, Paris (FR)

( * ) Notice: Subject to any disclaimer, the term of this patent is extended or adjusted under 35 U.S.C. 154(b) by 1051 days.

(21) Appl. No.: 11/628,321

(22) PCT Filed: Jun. 4, 2004

(86) PCT No.: PCT/FR2004/001395
§ 371 (c)(1),
(2), (4) Date: Dec. 4, 2006

(87) PCT Pub. No.: WO2006/003270
PCT Pub. Date: Jan. 12, 2006

(65) Prior Publication Data
US 2008/0014563 A1    Jan. 17, 2008

(51) Int. Cl.
*G06K 9/00* (2006.01)
(52) U.S. Cl. ..................... 382/118
(58) Field of Classification Search ............... None
See application file for complete search history.

(56) References Cited

PUBLICATIONS

Aleix M. Martinez et al., "PCA versus LDA", IEEE Transactions on Pattern Analysis and Machine Intelligence, vol. 23, No. 2, Feb. 2001, pp. 228-233.*

Liu, KE, "Algebraic Features Extraction for Image Recognition Based on an Optimal Discriminant Criterion," Pattern Recognition, vol. 26, No. 6, p. 903-911, 1993. XP008040298.

Yang, Jian, "Uncorrelated Projection Discriminant Analysis and its Application to Face Image Feature Extraction," International Journal of Pattern Recognition and Artificial Intelligence vol. 17, No. 8, p. 1325-1347, 2003. XP-001186868.

Yang, Jian, "Two-Dimensional PCA: A New Approach to Appearance-Based Face Representation and Recognition," IEEE, vol. 26, No. 1, p. 131-137, Jan. 2004. XP 000698170.

Belhumeur, Peter N., "Eigenfaces vs. Fisherfaces: Recognition Using Class Specific Linear Projection," IEEE, vol. 19, No. 7, p. 711-720, Jul. 1997. XP 000698170.

Li, Ming, "A Novel Statistical Linear Discriminant Analysis for Image Matrix: Two-dimensional Fisherfaces," Institute of Information Science, Beijing Jiaotong University, vol. 2, p. 1419-1422, Aug. 31, 2004. XP008040329.

(Continued)

*Primary Examiner*—Brian P Werner
(74) *Attorney, Agent, or Firm*—McKenna Long & Aldridge LLP

(57) ABSTRACT

The invention relates to a method for recognizing faces in digital images consisting in providing for a knowledge base which contains face images and is hierarchical into several classes each of which comprises different images of the same person. The invention relates to pre-processing said knowledge base in such a way that a minimization of variance in each class and a maximization of variance between different classes are simultaneously obtainable, thereby making it possible to form a vectorial base comprising the discriminant component of said knowledge base. The comparison of a recognizable face with a pre-processed reference face such as the knowledge base and an eventual reconstruction of a recognized face are also disclosed.

14 Claims, 13 Drawing Sheets

OTHER PUBLICATIONS

Sirovich, I., "Low-dimensional Procedure for the Characterization of Human Faces," vol. 4, No. 3, p. 519-524, Mar. 1987. XP 00522491.

Turk, Matthew, "Eigenfaces for Recognition," Journal of Cognitive Neuroscience, vol. 3, No. 1, p. 71-86, Jan. 1991. XP 000490270.

Yambor, Wendy, "Analyzing PCA-based Face Recognition Algorithms: Eigenvector Selection and Distance Measures," Computer Science Department, Colorado State University, Jul. 1, 2000.

* cited by examiner

FIG. 2
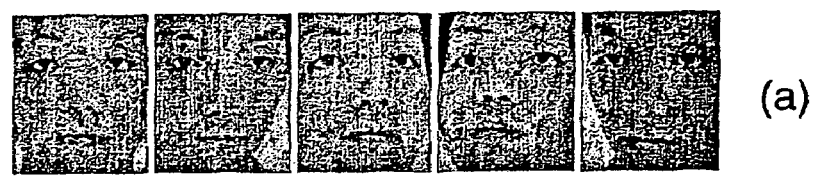 (a)
 (b)
FIG. 3

(a)
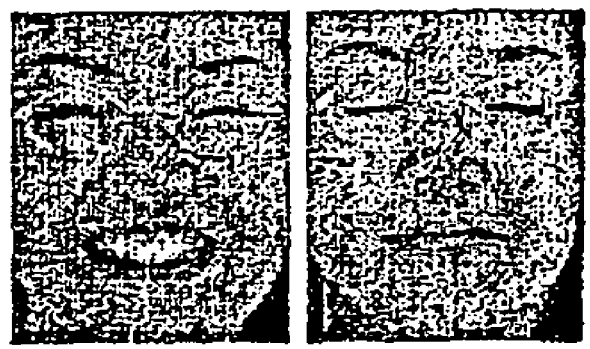
(b)
FIG. 4

METHOD FOR RECOGNISING FACES BY MEANS OF A TWO-DIMENSIONAL LINEAR DISCRIMINANT ANALYSIS

This application claims priority from PCT/FR2004/01935, filed Jun. 4, 2004 which is hereby incorporated by reference in its entirety.

The present invention relates to the field of the recognition of faces in digital images.

BACKGROUND OF THE INVENTION

In the field of face recognition, use is made nowadays of statistical procedures for classification by reduction of dimensions. Statistical models of reduction of dimension are constructed by virtue of a set of images of faces that is referred to hereinafter as the "learning base" (or BA for short). One and the same person is preferably represented several times in the learning base. The various representations of the face of one and the same person are then referred to as a "class".

The two major applications of face recognition are "authentication" and "Identification".

Within the framework of authentication, the face to be recognized is compared with the faces of the learning base so as to assign it an identity. Biometry or video surveillance, for example, are applications based on authentication.

Within the framework of identification, once the model has been constructed, the learning base is no longer used. One has a first unknown face and a second unknown face and one seeks to compare these two faces so as to determine whether or not it is the same person.

The indexing of movie sequences, for example video sequences, may use applications of this type. The interest could for example be to detect in a video all the sequences where one and the same person is found.

The recognition of faces in digital images currently proposes various methods that can be classed in the following manner:

- structural procedures based on the analysis of the geometrical components of the face;
- so-called "neural network based" procedures (or "support vector machines"); and
- statistical procedures which currently play a fundamental role in dimension reduction and show excellent performance.

Tools for statistical analysis of data of large dimension n make it possible to reduce a complex system of correlations by projecting initial data into a space of lesser dimension k<<n. According to the intended objective, the projection space thus obtained may give:

- optimal reconstruction of the learning base for a fixed dimension k; this is the object of the statistical procedure termed "principal component analysis" (or "PCA" hereinbelow),
- or better discrimination between different persons (or "classes" as indicated hereinabove) of the learning base; this is the object of the statistical procedure termed "linear discriminant analysis" ("LDA" hereinafter).

Described hereinafter is the procedure termed "principal component analysis" of the prior art and set forth in particular in:

"*Eigenfaces for recognition*", M. Turk and A. Pentland, *Journal of Cognitive Neuroscience*, vol. 3, March 1991, pages 71-86.

A commonly used definition of the PCA is that which associates, with an input set of vectors, a set of orthogonal principal axes (termed "principal components") and on which the projection of the variance of the input vectors is a maximum.

Here, it is indicated that the term "vector" refers to a column vector. Moreover, X denotes the vector to be projected, of large size l·m. Its orthogonal projection is denoted $\hat{X}$. This projection is performed onto the space of dimension k, an orthogonal base of which is stored in the form of columns in the matrix P. The matrix P is therefore of size (l·m)×k. The projection of the vector X is then expressed by:

$$\hat{X} = P^T X \quad (1)$$

The matrix P is called the "matrix of projection of the initial space into the space of principal components".

As criterion to be maximized we choose:

$$J(P) = \text{trace}(S^p) \quad (2)$$

where $S^p$ denotes the covariance matrix of the learning base projected into the base of P, i.e.:

$$S^p = \frac{1}{n}\sum_{i=1}^{n}(\hat{X}_i - \overline{\hat{X}})(\hat{X}_i - \overline{\hat{X}})^T \quad (3)$$

where n denotes the number of images present in the learning base.

If $X_i$ denotes the input vector corresponding to the $i^{th}$ vector of the learning base BA, we have:

$$\hat{X}_i = P^T X_i \text{ and } \overline{\hat{X}} = \frac{1}{n}\sum_{i=1}^{n}\hat{X}_i$$

It is indicated that maximizing the criterion according to relation (2) amounts to maximizing the criterion:

$$P = \underset{\mathcal{R}^{(l \cdot m)} \times \mathcal{R}^k}{\text{Argmax}}|P^T S P| \quad (4)$$

where $\mathcal{R}^{(l,m)} \times \mathcal{R}^k$ is the set of matrices with real coefficients of size (l·m)×k.

S is the covariance matrix of the learning base BA, of size (l·m)×(l·m), given by the following relation:

$$S = \frac{1}{n}\sum_{i=1}^{n}(X_i - \overline{X})(X_i - \overline{X})^T \quad (5)$$

where, with the notation given previously:

$$\overline{X} = \frac{1}{n}\sum_{i=1}^{n}X_i.$$

It is shown that, under the hypothesis that the vectors $X_i$ of the learning base are Gaussian vectors, that are pairwise independent and identically distributed (property denoted "iid" hereinafter), P is composed of the k eigenvectors of S that are associated with the k largest eigenvalues (k fixed).

The PCA is commonly used to represent or recognize faces. The procedure for recognizing faces that is best known and based on the PCA has been proposed in the aforesaid document: "*Eigenfaces for recognition*", M. Turk and A. Pentland, *Journal of Cognitive Neuroscience*, vol. 3, March 1991, pages 71-86.

The procedure requires a learning base consisting of a set of images presented as input in the form of a vector per image. Each image $X_i$, consisting of l rows and m columns of pixels as grey levels, is thus reduced to a vector of size l·m by concatenating its rows of pixels. A PCA is performed directly on these vectors, giving a set of k principal components of the same size l·m as the initial image vectors and are designated by the term "eigenfaces". The number k of principal components to be retained may be fixed or else determined from the eigenvalues.

The comparison between two images of faces is made following a projection into the base of the eigencomponents according to relation (1) hereinabove. The two projected vectors are compared according to a measure based on a predetermined criterion of similarity.

It is shown in particular that the principal components constitute the subspace of dimension k minimizing the mean quadratic error of reconstruction, defined as being the distance denoted $L_2$ between the learning base and its orthogonal projection in the base consisting of the principal components.

However, a drawback of the procedure resides in the fact that this base does not necessarily offer an optimal classification of the data. Specifically, the principal components maximize the total variance of the learning base, without distinguishing the variations internal to each class from the variations between classes.

Described hereinafter is a procedure arising out of Linear Discriminant Analysis (or LDA), of the prior art, commonly used in shape recognition and described in particular in:

"*Eigenfaces vs. Fisherfaces: Recognition Using Class Specific Linear Projection*", P. Belhumeur, J. Hespanha and D. Kriegman, *Special Theme Issue on Face and Gesture Recognition of the IEEE Trans. on Pattern Analysis and Machine Intelligence,* 19(7), pages 711-720, July 1997.

It makes it possible to find the subspace that jointly maximizes the variations between classes and minimizes the mean variation inside the classes, so as to give a subspace called the "discriminant subspace" of the initial space and ensuring better discrimination between classes.

The LDA is distinguished from the PCA in particular in that the LDA is a supervised procedure, that is to say the construction of the model requires, for each image of the learning base, the datum of a vector as well as the datum of its membership class.

Here the hypothesis is made that the images of one and the same class, these being represented in the form of vectors, are Gaussian vectors having the iid property described hereinabove. P denotes the orthogonal projection matrix from the initial space into the discriminating subspace within the sense of equation (1) hereinabove. If we choose as criterion to be maximized the expression:

$$J(P) = \text{trace}((S_w^P)^{-1} S_b^P) \tag{6}$$

where $S_w^P$ (respectively $S_b^P$) is the intra-class (respectively inter-class) covariance matrix of the learning base projected by the orthogonal projection P. P is a matrix of size (l·m)×k. It is recalled that a class is a set of representations of one and the same face in the learning base. It is indicated also that the terms "intra-class" are concerned with properties within one and the same class, whereas the terms "inter-classes" are concerned with properties from one class to another.

If C denotes the total number of classes of the learning base, we define:

$$S_b^p = \frac{1}{n}\sum_{c=1}^{C} n_c (\overline{\hat{X}^c} - \overline{\hat{X}})(\overline{\hat{X}^c} - \overline{\hat{X}})^T \tag{7}$$

and $$S_w^p = \frac{1}{n}\sum_{c=1}^{C}\sum_{i \in C} (\hat{X}_i - \overline{\hat{X}^c})(\hat{X}_i - \overline{\hat{X}^c})^T$$

where:
$n_c$ is the number of images of the person corresponding to class c and contained in the learning base, $$\overline{\hat{X}^c} = \frac{1}{n_c}\sum_{i \in c} \hat{X}_i,$$

and $\hat{X}_i = P^T X_i$ is a vector of size k corresponding to the image $X_i$ projected into the base P according to equation (1) hereinabove.

It is then indicated that maximizing the criterion according to relation (5) amounts to choosing the matrix P in the following manner:

$$P = \underset{\mathcal{R}^{(l \cdot m) \times \mathcal{R}^k}}{\text{Argmax}} \frac{|P^T S_b P|}{|P^T S_w P|} \tag{8}$$

where:
$S_b$ is the inter-class covariance matrix for the learning base such that $$S_b = \frac{1}{n}\sum_{c=1}^{C} n_c (\overline{X^c} - \overline{X})(\overline{X^c} - \overline{X})^T, \tag{9}$$

and
and $S_w$ is the intra-class covariance matrix such that:

$$S_w = \frac{1}{n}\sum_{c=1}^{C}\sum_{i \in c} [(X_i - \overline{X^c})(X_i - \overline{X^c})^T]. \tag{10}$$

The columns of P contain the k eigenvectors of the matrix $S_w^{-1} S_b$ associated with the k largest eigenvectors, where $S_w^{-1}$ is the inverse of $S_w$.

As a general rule, the dimension of the input vectors is much bigger than the number of examples acquired in the learning base (l·m>>n). The matrix $S_w$ is then singular and noninvertible.

It is then possible to perform the LDA in a base, determined previously by applying the PCA procedure, the dimension of this base being less than the number of examples of the learning base. This approach is designated hereinafter by the abbreviation "PCA+LDA".

The number of components to be retained, called "Fisherfaces", may be determined thereafter in the same manner as for the PCA described hereinabove. The classification is performed after orthogonal projection into the space of Fisherfaces, in the same manner as for the PCA.

Following the numerous comparative studies between the PCA and LDA of the prior art, it is taken as read that if one considers a learning base of sufficient size and sufficiently representative, the LDA gives better results than the PCA and makes it possible above all to better manage the differences of illumination in the pictures of the faces, the differences of facial expressions and of pose.

Very recently, another procedure based on a "bidimensional" PCA has been proposed in:

"*Two-dimensions PCA: A New Approach to Appearance-Based Face Representation and Recognition*", J. Yang, D. Zhang, A. F. Frangi and J. Y. Yang, in IEEE Transactions on Pattern Analysis and Machine Intelligence, vol. 26, no. 1, January 2004.

This procedure is described hereinafter.

One constructs a model on the basis of the set of images of the learning base that are stored in the form of matrices of pixels having l rows and m columns. More particularly, we seek k orthonormal vectors, $P=[P^1, \ldots, P^k]$ of length m, such that the projection of the learning base onto this base of vectors ensures a maximum of variance of the learning base. The projection of an image X of size l×m onto the matrix P of size m×k is given by the following linear relation, where $\hat{X}$ is a matrix of size l×k:

$$\hat{X} = XP \quad (11)$$

The criterion to be maximized is as follows:

$$J(P) = \text{trace}(S^p) \quad (12)$$

$S^p$ designates the covariance matrix (termed "bidimensional" as opposed to a unicolumn vector) of the n vectors of the images projected from the learning base onto the vector base P. If we consider:

that $X_i$ is the matrix of size l×m of the $i^{th}$ image of the learning base, that $\hat{X}_i = X_i P$ is the matrix of size l×k projected from $X_i$ by P according to equation (11) hereinabove, and that $$\bar{\hat{X}} = \frac{1}{n} \sum_{i=1}^{n} \hat{X}_i$$

is the mean matrix projected (of size l×k) from the learning base onto P, we obtain $$S^p = \frac{1}{n} \sum_{i=1}^{n} (\hat{X}_i - \bar{\hat{X}})^T (\hat{X}_i - \bar{\hat{X}}) \quad (13)$$

we show that the criterion according to relation (12) is equivalent to:

$$J(P) = P^T S P \quad (14)$$

In this expression, S is the covariance matrix of the columns of the images and it is calculated as follows:

$$S = \frac{1}{n} \sum_{i=1}^{n} (X_i - \bar{X})^T (X_i - \bar{X}) \quad (15)$$

where $$\bar{X} = \frac{1}{n} \sum_{i=1}^{n} X_i,$$

is a mean matrix, of size l×m, of the n images of the learning base.

The criterion to be maximized according to relation (14) is called the "generalized total dispersion criterion". As for the PCA, the k vectors $[P^1, \ldots, P^k]$ to be retained are the eigenvectors of the matrix S corresponding to the largest eigenvalues. $P=[P^1, \ldots, P^k]$ denotes the projection matrix within the sense of relation (11). The projection of the image $X_i$ by P is denoted $\hat{X}_i=[\hat{X}_i^1, \ldots, \hat{X}_i^k]$ where $\hat{X}_i^j=X_i P^j$ is the vector of length l (projection of the image $X_i$ onto the vector $P^j$).

The number k of components to be retained may be determined in the same manner as for the PCA, seen hereinabove.

As before, the comparison between two faces is performed in the projected space. Here, the projection of an image onto P no longer gives a vector, but a matrix. Therefore, here we use a measure of similarity between matrices $\hat{X}_i$ of size l×k. The distance between the matrices $\hat{X}_i$ and $\hat{X}_t$ may be as follows:

$$d(\hat{X}_i, \hat{X}_t) = \sum_{j=1}^{k} \|\hat{X}_i^j - \hat{X}_t^j\|^2 = \sum_{j=1}^{k} \sqrt{(\hat{X}_i^j - \hat{X}_t^j)^T (\hat{X}_i^j - \hat{X}_t^j)} \quad (16)$$

The bidimensional PCA, conducted with a very small number of components k, gives better results than the classical PCA, on the same bases "Yale Face DataBase B" "ORL" and "AR", which are among the bases of faces that are best known.

As indicated hereinabove, numerous procedures for reducing dimensions having however been proposed in the prior art, the major disadvantage of the PCA and LDA procedures resides in the fact that the size m·l of the vectors of the learning base is generally very large, this leading to:

an excessive number of calculations during classification;

difficulties during the evaluation of the covariance matrices S, $S_b$ and $S_w$;

the non-invertibility of the matrix $S_w$.

Within the framework of the LDA, to circumvent this problem, one generally performs two projections instead of just one, by combining the PCA and LDA procedures (so-called "PCA+LDA" processing). However, this approach considerably increases the complexity of the LDA. Moreover, the choice of linear combinations of the principal components as discriminating components, on the one hand, is not justified and, on the other hand, it lacks rigor.

The bidimensional PCA, even though it does not exhibit this drawback and though it guarantees optimal conservation of the global variance of the projection learning base, does not make it possible to distinguish variations between classes and variations inside classes. Like the PCA procedure, this technique is well suited to the reconstruction of images of faces after compression by reduction of dimension. However, as for the PCA, it does not necessarily ensure good discrimination between classes.

SUMMARY OF THE INVENTION

The present invention is intended to improve the situation.

An aim of the invention is to guarantee better discrimination between the classes of the learning base.

Another aim of the invention is to afford a reduction in the calculations and in the memory space necessary for storing the model constructed so as to be able to classify the images, with respect to the standard discriminating procedures such as the LDA.

For this purpose it proposes a method of recognizing faces in digital images, by statistical processing, in which there is provided a learning base containing images of faces, this learning base being hierarchized as a plurality of classes each comprising different pictures of one and the same person.

In the method within the meaning of the invention, the images are represented by matrices whose coefficients are values of pixels. The method then comprises a preprocessing of the learning base, in which:
  a matrix system representative of a variance between different classes and of the inverse of a variance in each of the classes is formed from these matrices, and
  a vector base comprising discriminating components of the learning base is determined from this matrix system, aiming jointly at a minimization of the variance in each of the classes and a maximization of the variance between different classes.

According to one of the advantages afforded by the present invention, the method is more robust to changes of facial expressions than the technique based on the PCA2D of the prior art and its implementation requires much less memory size and less capacity for calculations than the classical LDA technique.

In a preferred embodiment, the preprocessing of the learning base comprises the following steps:
  a mean face of all the faces of the learning base is estimated;
  a mean face is estimated for each of the classes;
  we compute:
    a first matrix, of intra-class covariance, corresponding to the mean of the matrices of the square deviation between each image of the learning base and the mean face of its class, and
    a second matrix, of interclass covariance, corresponding to the mean of the matrices of the square deviation between the mean face of each class and the mean face of the learning base;
  the eigensystem of a matrix product formed by the multiplication of the second matrix by the inverse of the first matrix is determined;
  and eigenvectors of said eigensystem are selected as discriminating components of the learning base.

To reduce the dimension of the vector base, the eigenvectors associated with a chosen limited number of largest eigenvalues are advantageously selected.

In another embodiment, the method which is the subject of the invention comprises a prior step to the formation of said matrix system and consisting in applying a transposition of the matrices representing the images of the learning base. It is indicated that this variant leads to discriminating components denoted "2D-rows", whereas the succession of steps above, without the transposition of the matrices, leads to discriminating components denoted hereinafter "2D-columns". This distinction will be made explicit in greater detail later.

Advantageously, the method can comprise a subsequent classification processing of an image of a face to be recognized, comprising the following steps:
  an identification matrix is constructed comprising vectors obtained by projecting the image of the face to be recognized onto said vector base,
  a reference matrix is constructed comprising vectors obtained by projecting a reference image onto said vector base, and
  the identification matrix is compared with the reference matrix, according to a chosen distance criterion.

Typically, said projection is performed by multiplying the matrix associated with the face to be recognized and/or the matrix associated with a reference face, by each of the selected eigenvectors.

In a first embodiment, the distance criterion comprises the evaluation of a sum of the distances between the corresponding columns of the identification and reference matrices. This distance may be given by relation (16) hereinabove but applied within the framework of the invention.

As a variant, the distance criterion is fixed between the identification matrix and the projected mean of each class of the learning base, in the guise of reference matrix. This distance is preferably estimated by relation (24), given and commented on later. Here, it is therefore possible to define a reference image as being the mean image of a class.

The reference image may on the contrary be a real image derived directly from the learning base. In this case, a possible application is the triggering of an alarm of a surveillance system if the comparison between a face to be recognized and one or more reference faces belonging to the learning base exhibits a distance greater than a threshold.

In another variant, the reference image does not belong to the learning base but it is derived from a previous picture. In this case, a possible application may consist in knowing how many times a person appears in a video sequence, a previous image of this person then being the reference image.

The method within the sense of the invention may advantageously comprise an additional step of reconstructing the images of faces, after a compression of the image data by reduction of dimension, since the choice of a limited number of discriminating components (or of eigenvectors as indicated hereinabove) allows this reduction in dimension.

The present invention may be implemented by a computer workstation driven by running an appropriate piece of software (or "computer program product"). In this regard, the present invention is aimed at such a computer program product, intended to be stored in a memory of a processing unit, or on a removable memory medium and intended to cooperate with a reader of said processing unit. This program comprises instructions for the implementation of all or part of the steps of the method hereinabove.

BRIEF DESCRIPTION OF THE DRAWINGS

Other characteristics and advantages of the invention will become apparent on examining the detailed description hereinafter, and the appended drawings in which:

FIG. 2 represents extracts of a general base of faces distributed on-line by the Intelligent Multimedia Laboratory,
FIG. 3 represents extracts of the learning base (a) and extracts of the test base (b), these bases being used to test the robustness to pose,
FIG. 4 represents extracts of the learning base (a) and of the test base (b) for testing the robustness to facial expressions, the non-neutral facial expressions being randomly distributed in the test base (two images per class) and in the learning base (two images per class), whereas a neutral facial expression per class has been introduced into the learning base.

DESCRIPTION OF PREFERRED EMBODIMENTS

A preferred embodiment of the present invention is aimed at a method based on a supervised statistical procedure, hereinafter referred to as "Bidimensional Linear Discriminant Analysis" (or "LDA2D").

The LDA2D can take two forms: LDA2D-columns and LDA2D-rows. These two procedures may optionally be combined so as to cross-check the information and/or compare the results that they each give.

Figure 1:
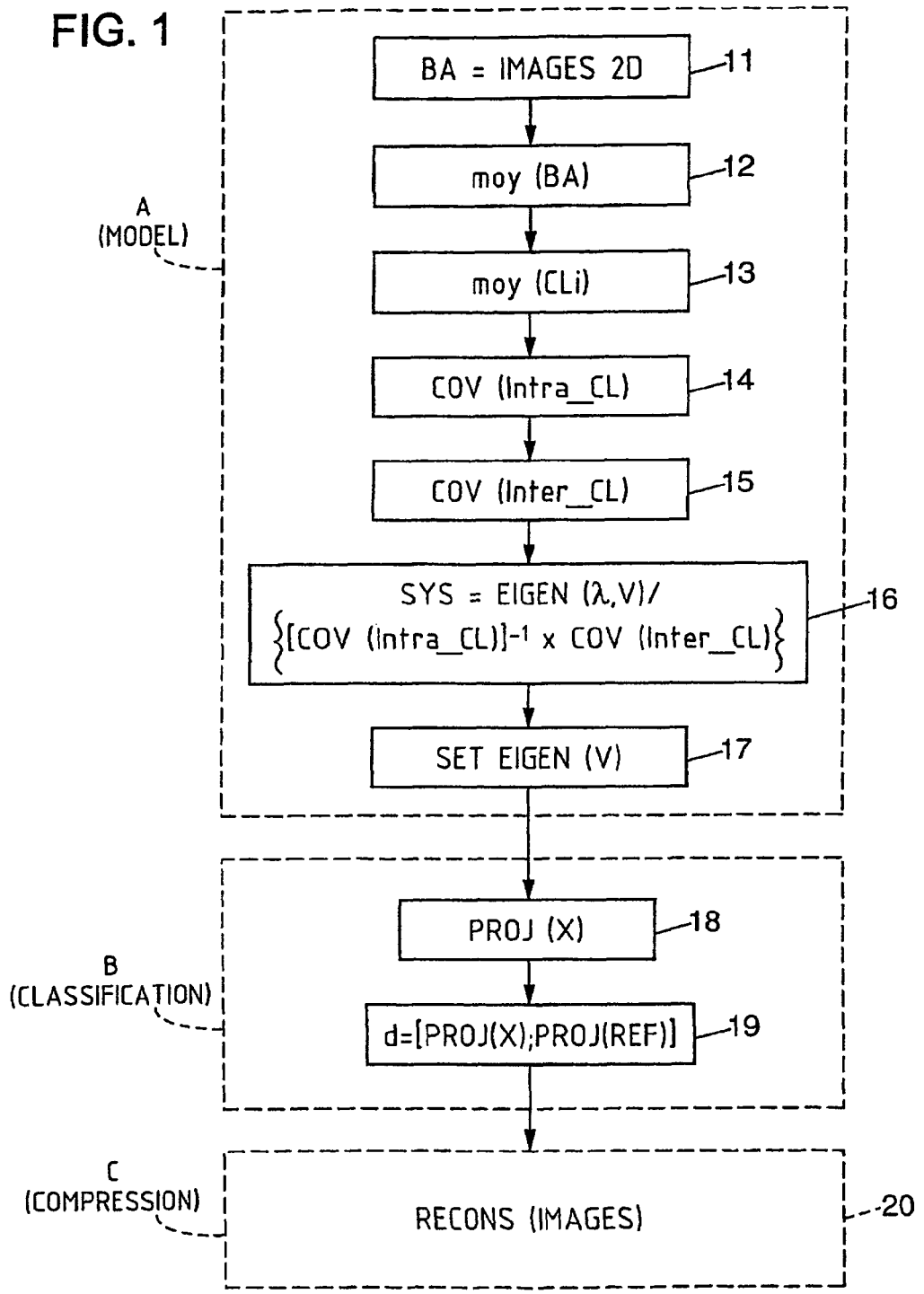
FIG. 1 diagrammatically illustrates the principal steps of the method within the sense of the invention.

Referring to FIG. 1, the LDA2D-columns consists of a method preferably comprising the principal steps hereinbelow.

For the construction of the model (box A of FIG. 1),
  we employ (step 11) a learning base BA containing images of faces in the form of bidimensional matrices, with values of matrix coefficients corresponding preferably to grey levels in the images. The learning base BA contains several views of each of the persons (as indicated hereinabove, the whole set of images representing one and the same person constitutes a class);
  we calculate (step 12) the mean face of all the faces of the learning base;
  we calculate (step 13) a mean face for each of the classes $CL_i$;

we calculate (step 14) a square 2D-columns intra-class covariance matrix (denoted COV(intra-CL)) corresponding to the mean of the matrices of the squared deviation between each image of the learning base and the mean face of its class;

we calculate (step 15) the square 2D-columns inter-class covariance matrix (denoted COV(inter-CL) corresponding to the mean of the matrices of the squared deviation between the mean face of each class and the mean face of the learning base;

we perform an inversion of the 2D-columns intra-class covariance matrix;

we perform a multiplication of the 2D-columns inter-class matrix by this inverted matrix;

we determine (step 16) the eigensystem of this product of matrices (denoted SYS);

we determine (step 17) the eigenvectors EIGEN(V) associated preferably with the largest eigenvalues as 2D-columns discriminating components.

These vectors constitute a vector base which will be used during the classification described hereinafter.

It is indicated that a variant of the matrix multiplication step consists rather in calculating the product of the inverse of the 2D-columns intra-class covariance matrix times the 2D-columns inter-class matrix. Next we calculate the eigensystem of this matrix product as previously.

For the classification (box B of FIG. 1):

one conducts (step 18) a projection of the image of the face to be recognized onto this base (typically by multiplying the matrix of the face to be recognized by each of the eigenvectors), the vectors thus obtained being grouped together to constitute a matrix associated with this image of a face;

this matrix is compared (step 19) with the matrix of an image representing a reference face, calculated in the same way. It is indicated that the reference face may typically belong to the learning base. The comparison between the two matrices is performed with the aid of a sum of the distances $L_2$ between the corresponding columns of these two matrices.

The LDA2D-rows consists of an equivalent method, but performed using the transposed matrices of the 2D images of faces. Here again, we evaluate a matrix product involving the intra-class and inter-class covariance matrices to form a system of discriminating components denoted "2D-rows".

The general method of processing may, advantageously but not necessarily, be concluded with a step 20 of reconstructing the faces after reduction of dimension (box C of FIG. 1). It is indicated moreover that the method within the sense of the invention and based on the LDA2D described hereinabove may be implemented not only for the recognition of faces, but also for a representation of faces with little data. In this second application of the method within the sense of the invention, one may speak of "compression of face image data". This embodiment will be described in detail later.

Of course, the steps of the formal calculation of the LDA2D are given only roughly in FIG. 1 and in the comments thereto hereinabove.

These steps are now described in greater detail. It is indicated that the notation employed hereinafter is then different from that which appears in FIG. 1.

The Bidimensional Linear Discriminant Analysis is used as a statistical tool for classifying data. As for the PCA2D described hereinabove, the images of the learning base are represented in the form of real matrices of size l×m. We seek the k vectors P of size m maximizing the criterion according to the relation:

$$J(P) = tr(S_w^{P^{-1}} S_b^P) \qquad (17)$$

where:

$S_w^P$ is the intra-class covariance matrix of the learning base projected onto P according to relation (11), i.e.

$$S_w^p = \frac{1}{n} \sum_{c=1}^{C} \sum_{i \in c} [(\hat{X}^c - \overline{\hat{X}})^T (\hat{X}_i - \overline{\hat{X}}^c)], \qquad (18)$$

and $S_b^P$ is the inter-class covariance matrix of the learning base projected onto P according to relation (11), i.e.

$$S_b^p = \frac{1}{m} \sum_{c=1}^{C} (\hat{X}^c - \overline{\hat{X}})^T (\hat{X}^c - \overline{\hat{X}}), \qquad (19)$$

$n_c$ being the number of images of class c, $$\overline{\hat{X}}^c = \frac{1}{n_c} \sum_{i \in c} \hat{X}_i,$$

$$\hat{X}_i = X_i P,$$

and $$\overline{\hat{X}} = \frac{1}{n} \sum_{i=1}^{n} \hat{X}_i$$

It will be noted that $\hat{X}_i$, $\hat{X}^c$ and $\hat{X}$ are matrices of size l×k.

It is indicated that maximizing the criterion according to relation (17) amounts to finding the set of components P that jointly maximizes the inter-class variance and minimizes the intra-class variance. Intuitively, it will be understood that the discrimination between projected classes may be significant. We show that:

$$S_w^P = P^T S_w P \text{ and } S_b^P = P^T S_b P \qquad (20)$$

where:

$$S_w = \frac{1}{n} \sum_{c=1}^{C} \sum_{i \in c} [(X_l - \overline{X}^c)^T (X_l - \overline{X}^c)] \text{ and} \qquad (21)$$

$$S_b = \frac{1}{n} \sum_{c=1}^{C} n_c (\overline{X}^c - \overline{X})^T (\overline{X}^c - \overline{X}) \text{ with}$$

$$\overline{X}^c = \frac{1}{n_c} \sum_{i \in c} X_l \text{ et } \overline{X} = \frac{1}{n} \sum_{i=1}^{n} X_i.$$

It is recalled that $X_i$, $\overline{X}$ and $\overline{X}^c$ are matrices of size l×m.

We refer to the matrix $S_w$ (respectively the matrix $S_b$), of size m×m, as the "2D-columns intra-class covariance matrix" (respectively the "2D-columns inter-class covariance matrix").

Maximizing the criterion according to relation (17) therefore amounts to finding the vectors P maximizing the ratio:

$$\frac{|P^T S_b P|}{|P^T S_w P|}$$

One is then dealing with the eigenvectors associated with the matrix $S_w^{-1} S_b$ corresponding to the largest eigenvalues.

If we assume that the number l of rows of the images of the learning base is less than the number n of examples present in the learning base (n>>l), this corresponding to a condition which generally holds, the matrix $S_w$ is invertible. Consequently, recourse to a first reduction of dimension, such as implemented in the PCA+LDA procedure described hereinabove, is unnecessary here.

This first form of implementation of the invention is called "Bidimensional Columns Linear Discriminant Analysis" (or "LDA2D-columns").

Once the model has been constructed (following steps 11 to 17 hereinabove), we therefore have a base $P=\lfloor P^1, \ldots, P^k \rfloor$ of k eigenvectors of dimensions m, allowing good discrimination of the classes of the learning base by projection into this base. These vectors will be called "2D-columns discriminating vectors".

It is indicated that as a variant, the Bidimensional Linear Discriminant Analysis, within the sense of the invention, may also be done using transposed image-matrices of the learning base. For any image $X_i$ of size l×m, we consider a new mode of projection onto the base of vectors $P=\lfloor P^1, \ldots, P^k \rfloor$, which is now of size l×k and the definition of the projection according to relation (11) is replaced by:

$$\hat{X}_i = X_i^T P \quad (22)$$

The maximization criterion is still based on relation (17) but the definition of $\hat{X}_i$ changes here. $\overline{\hat{X}}^c$ and $\overline{\hat{X}}$ are now matrices of size m×k.

$S_w$ and $S_b$ are henceforth calculated as follows:

$$S_w = \frac{1}{n} \sum_{c=1}^{C} \sum_{i \in c} \left[ (X_i - \overline{X}^c)(X_i - \overline{X}^c)^T \right] \text{ and} \quad (23)$$

$$S_b = \frac{1}{n} \sum_{c=1}^{C} n_c (\overline{X}^c - \overline{X})(\overline{X}^c - \overline{X})^T$$

This new matrix $S_w$ (respectively $S_b$), of size l×l, is called the "2D-rows intra-class covariance matrix" (respectively "2D-rows inter-class covariance matrix").

The method continues as described above. It may be considered that the number m of columns of the images of the learning base is assumed to be less than the number n of examples present in the learning base (m>>n). The matrix $S_w$ is therefore invertible. The construction of this new model therefore leads to the determination of a base $P=\lfloor P^1, \ldots, P^k \rfloor$ of k vectors of dimensions l, allowing good discrimination of the classes of the learning base by projection into this base. These vectors are called "2D-rows discriminating vectors".

The latter mode of implementation of the Bidimensional Linear Discriminant Analysis is referred to as "Bidimensional Row Linear Discriminant Analysis" (or "LDA2D-rows").

The general method (using an LDA2D-rows or an LDA2D-columns) continues with a classification of the faces of the learning base (box B of FIG. 1).

Here we present the classification for the LDA2D-columns. However, the transposition to LDA2D-rows is deduced therefrom naturally, by replacing the projection according to relation (11) by the projection according to relation (22).

The matrix of each image $X_i$ of the learning base is projected into the base $P=\lfloor P^1, \ldots, P^k \rfloor$ within the sense of relation (11) to obtain a matrix $\hat{X}_i$ per image, of size l×k, corresponding intuitively to the position of the image $X_i$ in the base P of the 2D-columns discriminating components. To compare two images of faces $X_i$ and $X_t$ in this base, the two matrices $\hat{X}_i$ and $\hat{X}_t$ must be compared. For this purpose, two similarity measures are provided:

the distance given by relation (16) subsequently designated by the name "columns distance $L_2$". This distance makes it possible to define the similarity between two images of faces and may therefore be used in the authentication framework and also in the identification framework; and a distance between an image of a face to be recognized $X_t$ and the mean of each class c of the learning base, given by the relation:

$$d(c, \hat{X}_t) = \sum_{j=1}^{k} \sqrt{\left( \overline{\hat{X}}^{c,j} - \hat{X}_t^j \right)^T \left( \overline{\hat{X}}^{c,j} - \hat{X}_t^j \right)} \quad (24)$$

where $\hat{X}_i^j = X_i P^j$ is the projection of the image $X_i$ onto the two 2D-column discriminating component $P^j$ and $$\overline{\hat{X}}^{c,j} = \frac{1}{n_c} \sum_{i \in c} \hat{X}_i^j$$

is a vector of size m.

Specifically, the LDA2D, unlike the PCA, is a supervised procedure. Hence the membership classes of the images of the learning base are known. Within the framework of an authentication using the LDA2D, it is therefore possible to define a more appropriate distance than the column distance $L_2$, as is given by the above expression (24).

The image of the face to be recognized by $X_t$ will subsequently be considered to belong to the nearest class in the sense of the distance according to formula (24), or else to the same membership class to which the nearest image belongs, according to the column distance $L_2$.

It is indicated that the choice of the number of 2D discriminating components to be retained may be made exactly in the same way as in the framework of a classical PCA or LDA, such as described in particular in: "*Analyzing PCA-based Face Recognition Algorithms: Eigenvector Selection and Distance Measures*", W. S. Yambor, B. Draper, and R. Beveridge, 2*nd Workshop on Empirical Evaluation in Computer Vision*, 2000.

The reconstruction of faces (box C of FIG. 1), performed optionally after the reduction of dimension, may be conducted as follows.

According to a property of the LDA2D, the projection $\hat{X}_i$ of the image $X_i$ and the corresponding 2D discriminating components $\lfloor P^1, \ldots, P^k \rfloor$ (rows or columns) may be combined to reconstruct an image of a face in the initial space $\Re^l \cdot \Re^m$. The eigenvectors $\lfloor P^1, \ldots, P^k \rfloor$ being orthonormal, the reconstruction $X'_i$ of the image $X_i$ is given simply by the following relation, using the LDA2D-columns:

$$X'_i = X_i P P^T = \hat{X}_i P^T \quad (25)$$

The reconstruction using the LDA2D-rows will be done according to the equation:

$$X'_i = PP^T X_i = P\hat{X}_i^T \quad (26)$$

with the appropriate notation of LDA2D-rows.

Described hereinafter is a particular embodiment, with an application to authentication. For this purpose, we construct a learning base as well as a test base, containing faces to be recognized.

The base of Intelligent multimedia laboratory (IML) has been chosen.

Represented in FIG. 2 is a sample of this base of faces. The base contains color images of one hundred and seven people, fifty-six of whom are men and fifty-one of whom are women. Each person is represented by seventeen views:

a front view under conditions of relatively neutral illumination,
four views corresponding to variations of illumination,
eight views under various poses, and
four views for various facial expressions.

The base exhibits variations of scale. Occultations such as the wearing of spectacles, the wearing of headgear, or the like, are also represented therein.

The tests conducted used two subsets of this IML base. The first subset makes it possible to illustrate the robustness of the procedures evaluated to pose (subsequently referred to as the "base of poses"). The second subset makes it possible to illustrate the robustness of the procedures evaluated to facial expression (referred to subsequently as the "base of expressions").

To test the robustness to pose, use is made of a learning base composed of five hundred and thirty-five images of faces (five views per class), according to different poses which are however close to the frontal pose. The test base, for its part, is composed of four hundred and twenty-eight images (four views per person), under more accentuated poses. An extract of the learning base and of the test base is given in FIG. 3. The facial expression is neutral and the brightness conditions are very similar inside each class. Few changes of brightness are observed between the various classes.

To test the robustness of the method to facial expressions, use has been made of a learning base composed of three hundred and twenty-one images of faces (three frontal views per person). One view represents a neutral facial expression, the other two are chosen at random from among the four facial expressions proposed in the base. The test base, for its part, is composed of two hundred and fourteen images (two views per person), representing the remaining facial expressions.

An extract of the learning base and of the test base is given in FIG. 4. The pose is frontal and the brightness conditions are similar inside one and the same class. Few changes of brightness are observed between the various classes. However, there is no cross-checking between the images of the test base and the images of the learning base.

All the images of the learning base, like those of the test base, have been preprocessed in such a way that the images are preferentially of size 150×130 pixels, with a distance of 70 pixels between two centers of pupils. The right eye and the top left corner of the image are situated at a distance of 30 pixels along the abscissa axis and of 45 pixels along the ordinate axis. The images, initially color, are simply transformed into luminance images, having grey levels, without any other pre-processing.

The variables considered are digital images, hence taking the form of discrete bidimensional variables. The processed images are for example sampled over a discrete grid of 150 rows and 130 columns and of values in the real luminance space of between 0 and 255.

The construction of the LDA2D-columns model is now described. Using the images of the learning base that are stored in the form of matrices of 150×130 pixels, we calculate the covariance matrices $S_w$ and $S_b$ given by relation (23). In particular we calculate the eigensystem of $S_w^{-1} S_b$ with the aid of a singular value decomposition. We ascertain the matrix $P = [P^1, \ldots, P^k]$ of the 2D-columns discriminating components. From this we deduce by projection by applying relation (11) the projections $\hat{X}_i$ of the faces of the learning base according to the matrix P, that we keep in memory for the following recognition phase.

For the recognition of the faces of the test base, all the faces $X_t$ of the test base are projected into the space P of 2D-column discriminating components by applying the equation (11), to obtain the matrices $\hat{X}_t$.

It is recalled that all the people an image of whom is in the test base are also represented across different images in the learning base.

The test image will be simply assigned to the class c that is nearest according to the distance criterion chosen. The similarity measures are given by the column distance $L_2$ of relation (16) and by the other distance estimate given by relation (24).

Allocation to a class and reconstruction of the faces are done as described hereinabove.

Once the faces have been reconstructed, they can be displayed in the form of images of size 150×130 pixels.

In what follows, we present a comparison of the experimental results between:

the implementation of the LDA2D within the sense of the invention,
a classical implementation of the LDA within the sense of the prior art: "*Eigenfaces vs. Fisherfaces: Recognition Using Class Specific Linear Projection*", P. Belhumeur, J. Hespanha and D. Kriegman, *Special Theme Issue on Face and Gesture Recognition of the IEEE Trans. on Pattern Analysis and Machine Intelligence*, 19(7), pages 711-720, July 1997,
and a classical implementation of the PCA2D within the sense of the prior art: "*Two-dimensions PCA: A New Approach to Appearance-Based Face Representation and Recognition*", J. Yang, D. Zhang, A. F. Frangi and J. Y. Yang, in IEEE Transactions on Pattern Analysis and Machine Intelligence, vol. 26, no. 1, January 2004.

To test the robustness to pose, the results of the LDA2D within the sense of the invention are compared with the results of the classical LDA, calculated according to the combination PCA+LDA procedure. To determine the number of principal components from which the LDA must be constructed, the PCA procedure has first of all been conducted in the base of poses. With more than 200 principal components, the rates of recognition decline substantially. It has therefore been chosen to retain 200 principal components to construct the classical LDA.

The distances used for the classification are a simple vector-to-vector distance $L_2$ (designated by "$L_2$" hereinafter), as well as a distance $L_2$ from a vector to the arithmetic mean of the projected vectors of each class (denoted by "$L_2 moyCl$").

Figure 5:
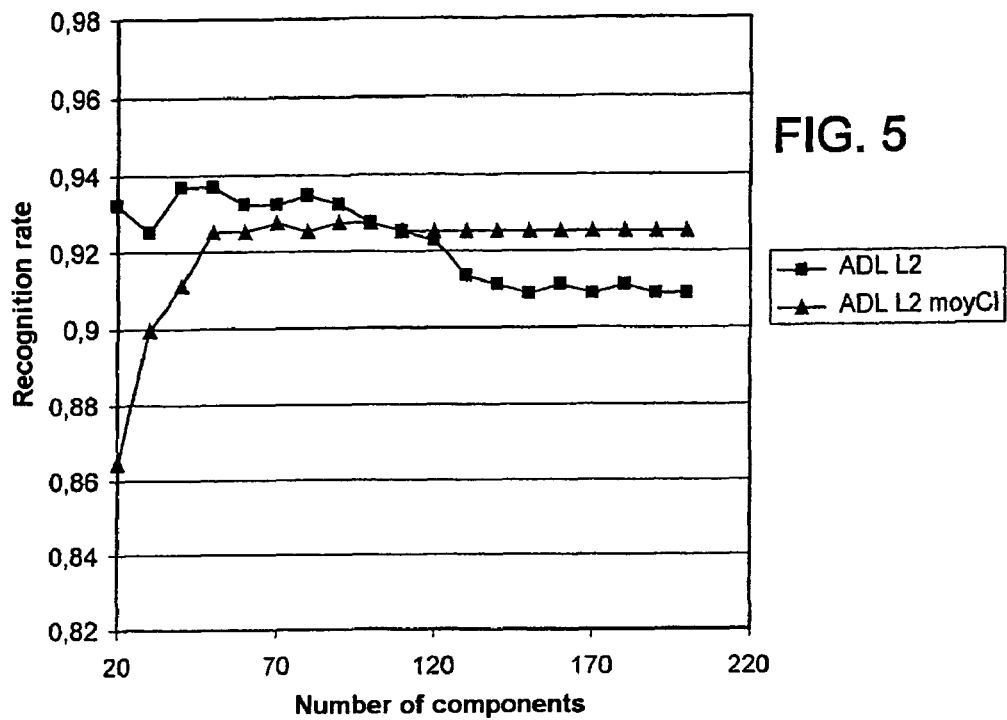
FIG. 5 represents the rates of recognition of faces of the base of poses, described hereinbelow, for the classical LDA, with two distance criteria, the usual distance $L_2$ (squares) between the vectors of the projected images and another distance $L_2$-moyCl (triangles) given by the relation $L_2$ between the vector of projected image to be identified and the mean vector of the projected images of a class of images.

FIG. 5 represents the recognition rates obtained by the LDA, compared for these two distances. The number of discriminating components retained is plotted along the abscissa. The model is constructed by combined PCA+LDA processing using 200 principal components. The best recognition rate (93.7%) is achieved for the distance $L_2$ with 40 discriminating components of 19500 pixels each.

Figure 6:
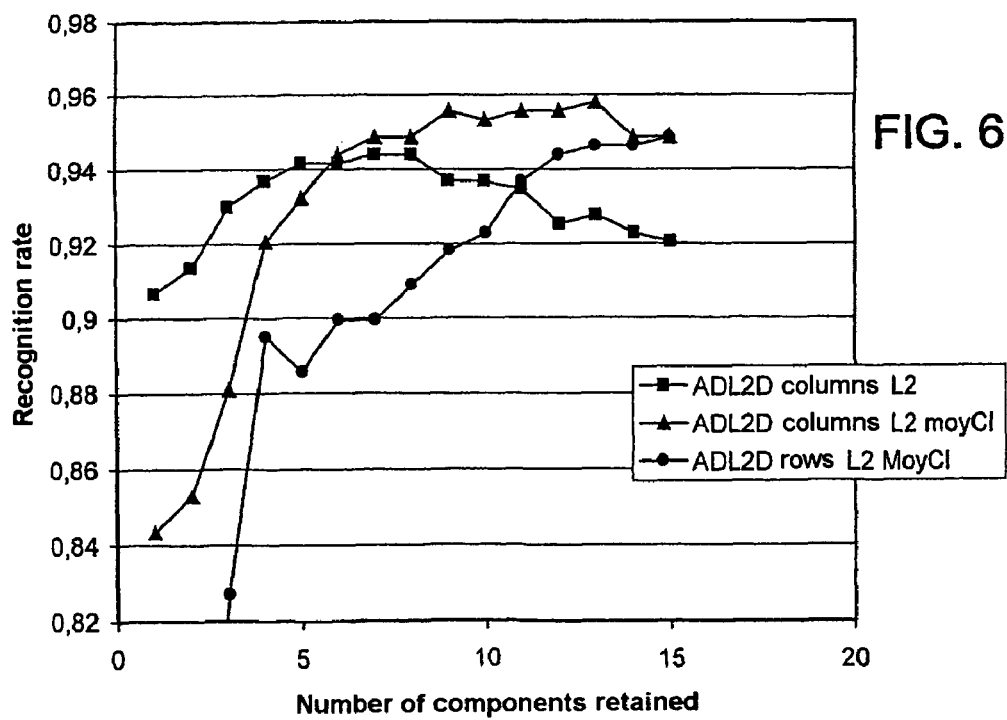
FIG. 6 represents the rates of recognition of faces of the base of poses, with use of the method within the sense of the invention, for:
  the LDA2D-columns, with as distance criterion, the distance $L_2$ (squares) given by relation (16) hereinabove,
  the LDA2D-columns, with as distance criterion, the distance $L_2$-moyCl (triangles) given by relation (24) hereinbelow,
  the LDA2D-rows, with as distance criterion, the distance $L_2$moyCl (disks) given by relation (24) hereinbelow.

FIG. 6 presents the rates of recognition of the LDA2D, both of the columns LDA2D and of the rows LDA2D. The distances compared are the distances $L_2$ of relation (16) (designated "$L_2$") and the distances according to relation (24) (denoted "$L_2$ moycl"). The number k of 2D rows or columns discriminating components retained is plotted as abscissa. It may be remarked that:

the distance $L_2$ moyCl here gives better results than the distance $L_2$ for columns LDA2D;

the LDA2D-rows here gives less good results than the LDA2D-columns for a small number of components, but the LDA2D-rows gives better results than the LDA2D-columns for a number of components greater than 15;

the LDA2D-columns gives better recognition rates than the LDA with far fewer components.

The best recognition rate of the LDA2D for the distance $L_2$ is 94.4% and is achieved with only 8 components. For the distance $L_2$ moyCl, the best recognition rate is 95.8% and is achieved with only 13 components.

As represented in FIG. 5, with 40 discriminating components, the LDA $L_2$ achieves its best recognition rate, which is 93.7%, i.e. 2.1% less than the LDA2D at its maximum. Moreover, the size of the discriminating components is 130×150=19500 pixels, whilst the size of the 2D-columns discriminating components is 130<<19500.

Thus, the LDA2D-columns give substantially better results than the classical LDA, and especially with a memory space required for the storage of the model which is much less.

Hereinafter, when alluding to the LDA2D, it will be understood that one is dealing with the LDA2D-columns.

Figure 7:
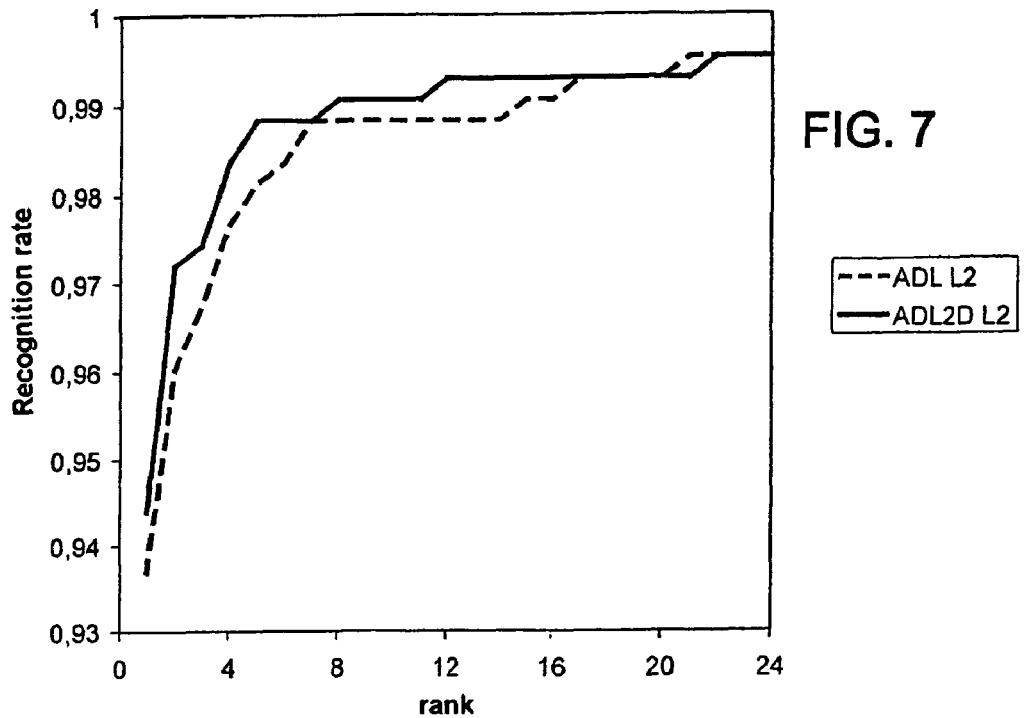
FIG. 7 represents CMC variations (CMC standing for "Cumulative Match Characteristic"), compared, of the classical LDA (dashes) for a distance criterion $L_2$ between the vectors of the projected images and of the LDA2D within the sense of the invention (solid lines) for a distance criterion $L_2$ given by relation (16) hereinabove and for the base of poses.

FIG. 7 gives the so-called "Cumulative Match Characteristic" (CMC) variations of the LDA2D $L_2$ with 8 2D-columns discriminating components and of the LDA $L_2$ with 40 discriminating components. In particular, it is indicated that a CMC variation makes it possible to give recognition rates at different ranks, in the sense that a face has been properly recognized at rank n if an image belonging to the correct class is the $n^{th}$ nearest in the sense of the distance $L_2$, after projection. The abscissa axis therefore indicates the rank n, whilst the ordinate axis indicates the aggregate recognition rates of the ranks less than or equal to the rank n. This FIG. 7 shows unambiguously that the recognition rates of the LDA2D are not only better at rank 1, as indicated hereinabove with reference to FIGS. 5 and 6, but also at the higher ranks. The LDA2D therefore gives better results than the LDA with a mean of practically 1% of additional recognition rate, over the first two ranks. Furthermore, in addition to giving better results, the LDA2D is much less expensive in terms of processing capacity. Here, we count 8 2D-columns discriminating components of 130 pixels against 40 discriminating components of 19500 pixels for the classical procedure.

FIGS. 5, 6, and 7 show that the LDA2D gives better results on the base of poses than the classical LDA, both at the first rank (comparison of FIGS. 5 and 6), and at higher ranks (FIG. 7). It will thus be understood that the LDA2D is more robust to changes of pose than the classical LDA.

Figure 8:
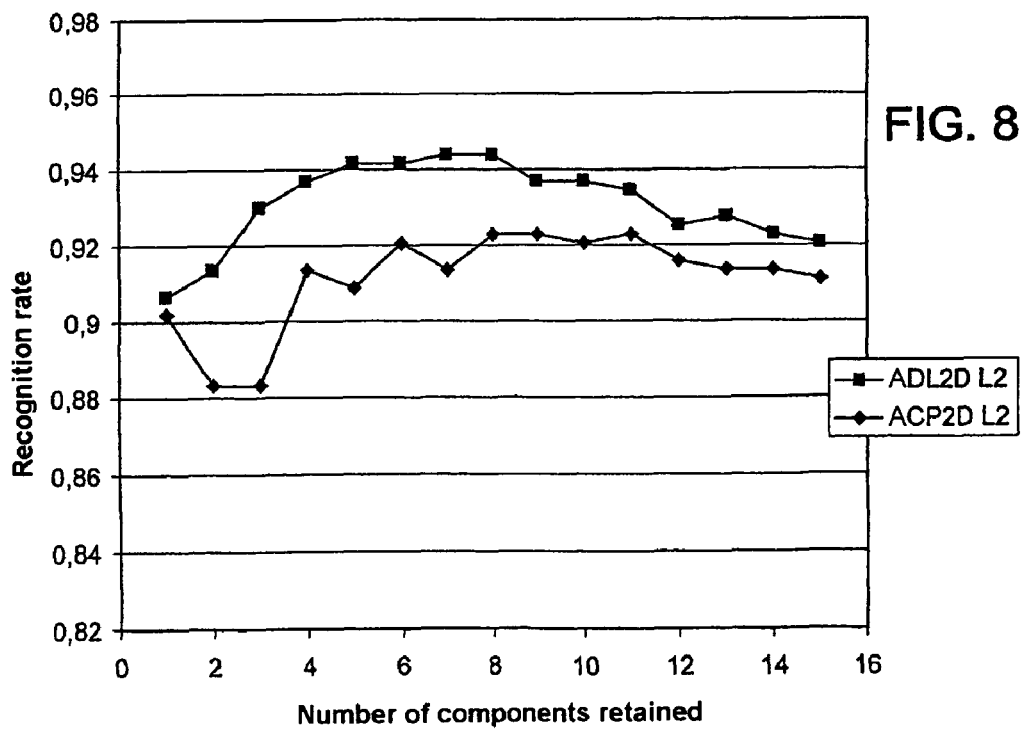
FIG. 8 represents the rates of recognition of faces of the base of poses, for the PCA2D of the prior art (diamonds) and for the LDA2D within the sense of the invention (squares), with the same distance criterion $L_2$ given by relation (16) hereinabove.

Referring now to FIG. 8, we now compare the results of the LDA2D and of the PCA2D of the prior art. FIG. 8 gives the recognition rates compared of the LDA2D and of the PCA2D as a function of the number of components retained, with a classification by distance $L_2$. For any fixed number of components k between 1 and 15, the LDA2D gives better results than the PCA2D. The components of the PCA2D and of the LDA2D both feature 130 pixels. The best recognition rate for the PCA2D (92.3%) is achieved with 8 components of 130 pixels each, and is 2.1% lower than the best recognition rate of the LDA2D, obtained also with 8 components.

Figure 9:
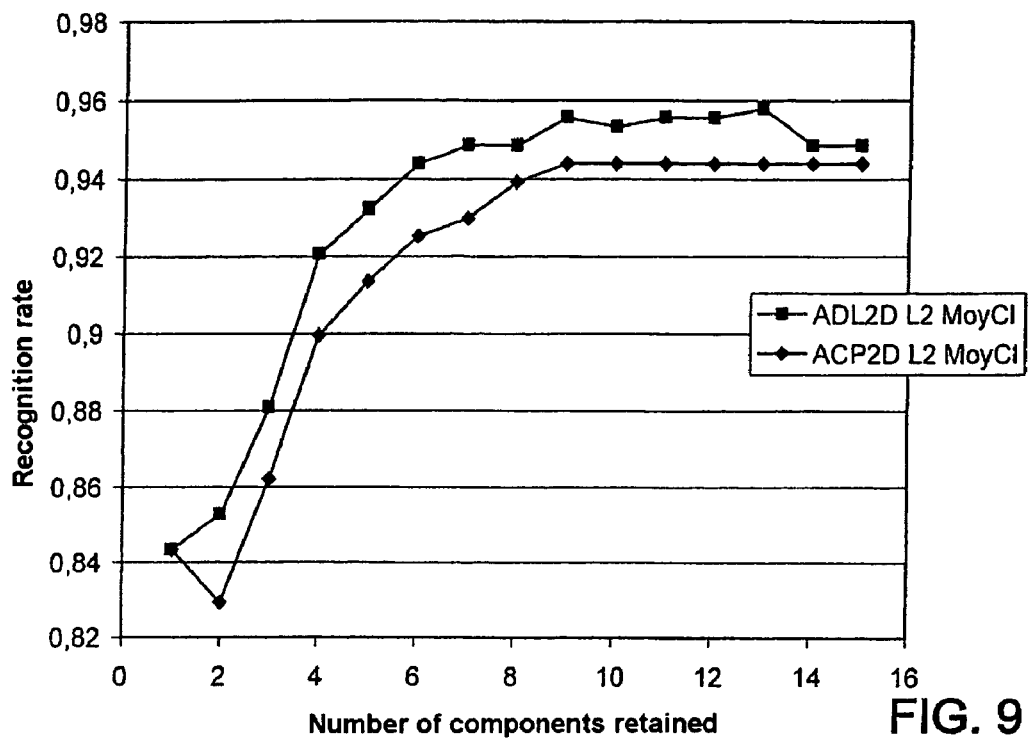
FIG. 9 represents the rates of recognition of faces of the base of poses, for the PCA2D of the prior art (diamonds) and for the LDA2D within the sense of the invention (squares), with the same distance criterion $L_2$-moyCl given by relation (24) hereinbelow.

FIG. 9 gives the compared recognition rates of the LDA2D and of the PCA2D as a function of the number of components retained, with a classification by distance $L_2$ moyCl. At any fixed number of components k between 1 and 15, the LDA2D gives better results than the PCA2D. The components of the PCA2D and of the LDA2D feature 130 pixels. The best recognition rate for the PCA2D (94.4%) is achieved with 9 components of 130 pixels each, and is 1.4% lower than the best recognition rate of the LDA2D, obtained with 13 components.

Figure 10:
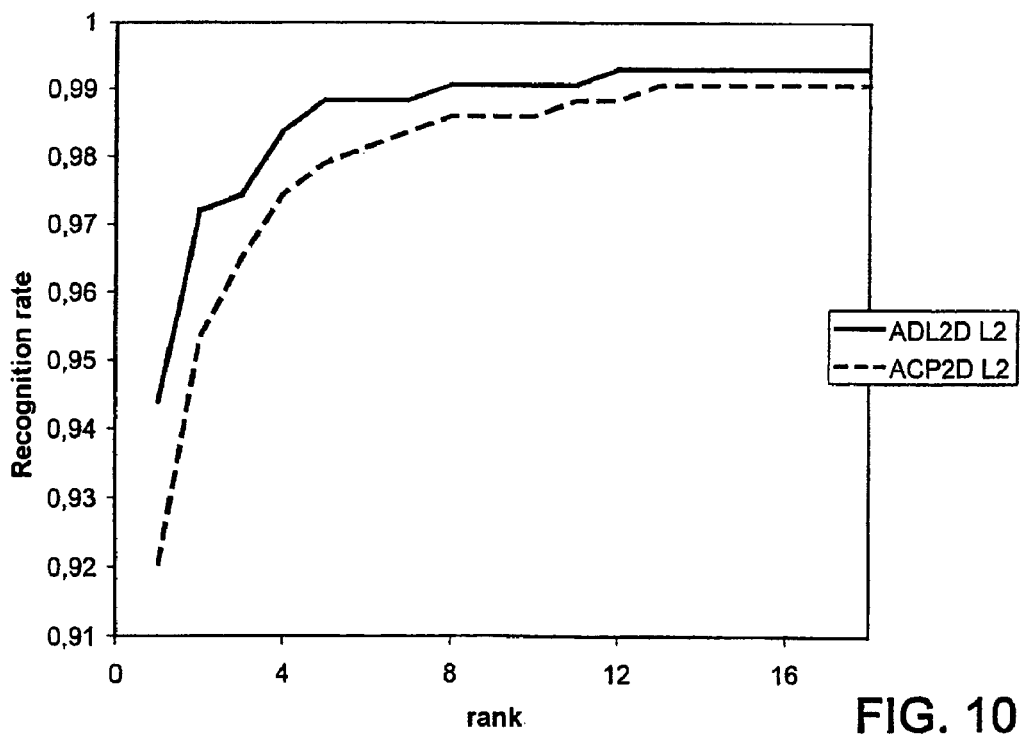
FIG. 10 represents compared CMC variations of the PCA2D of the prior art (dashes) and of the LDA2D within the sense of the invention (solid lines) for a distance criterion $L_2$ given by relation (16) hereinabove, for the base of poses.

FIG. 10 gives the compared CMC variations of the LDA2D and of the PCA2D with a distance $L_2$. The two CMC variations have been calculated using 8 components. The LDA2D gives better results than the LDA with on average a recognition rate of 2.1% higher over the first two ranks.

FIGS. 8, 9 and 10 show that the LDA2D gives better recognition rates than the PCA2D, both at rank 1 for the same number of components retained ranging from 1 to 15 (FIGS. 8 and 9) and also at higher ranks (FIG. 10). The LDA2D is therefore more robust to changes of pose than the PCA2D.

Figure 11:
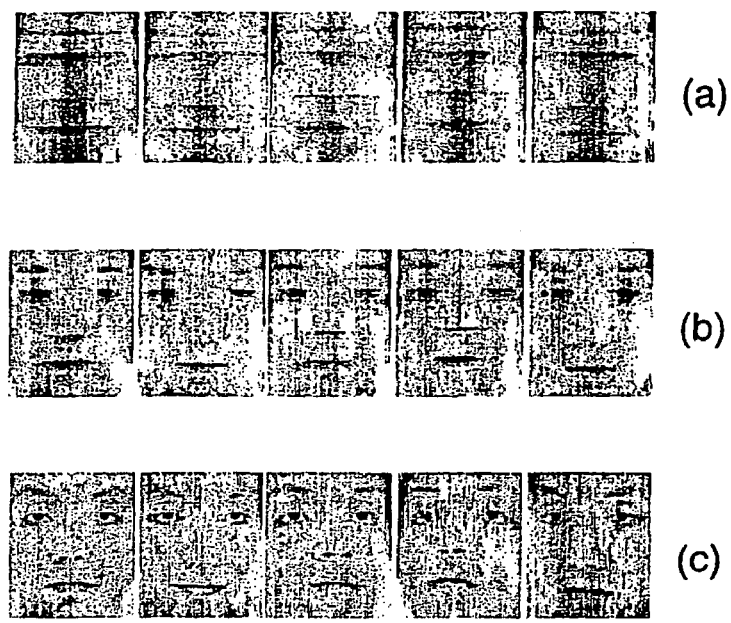
FIG. 11 illustrates the reconstructions within the sense of the invention of images of the base of poses, with two 2D-columns discriminating components (a), with three 2D-columns discriminating components (b) and with twenty 2D-columns discriminating components (c)

Represented in FIG. 11 are the reconstructions of the images shown in FIG. 3. It is found that using just three components, the facial features (eyes, nose, mouth) are already apparent, although without being able to distinguish the poses. It will also be remarked that a satisfactory reconstruction of the initial image is already obtained with 20 components.

The results of the LDA2D are now compared with those of the classical LDA and with those of the PCA2D to test the robustness to changes of facial expressions. The processing is applied to the "base of expressions" defined hereinabove.

Figure 12:
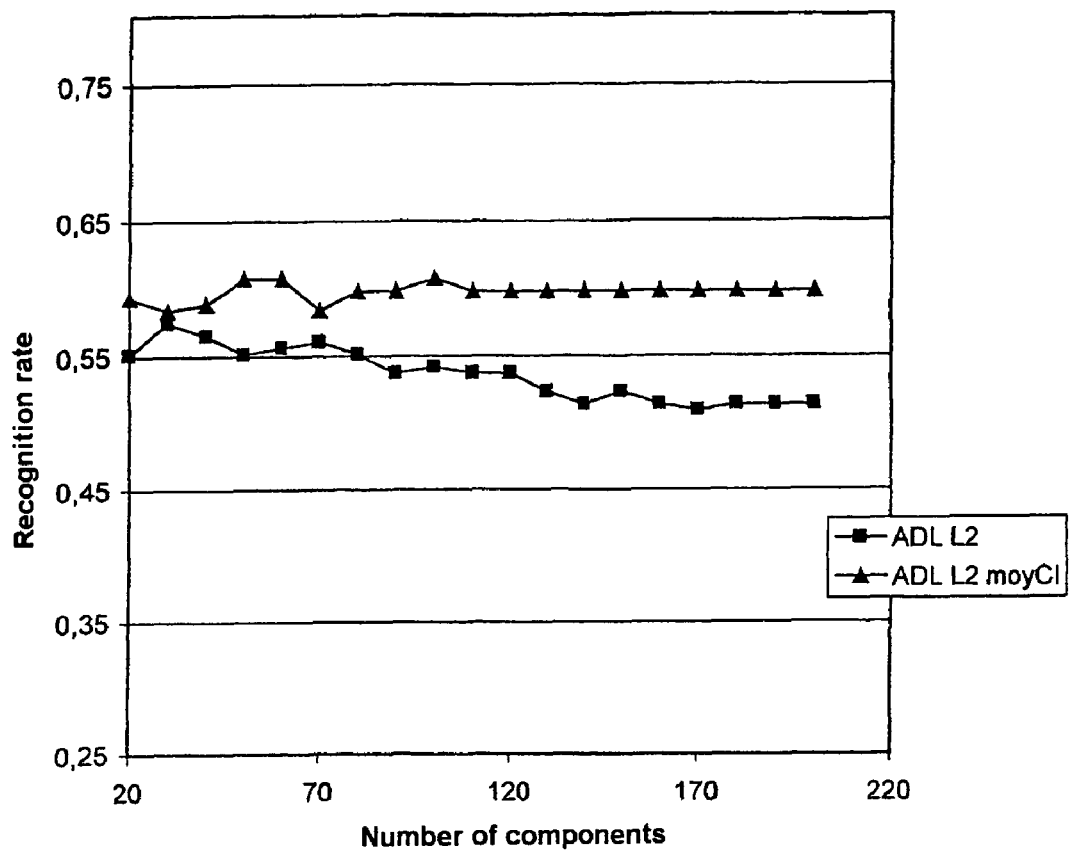
FIG. 12 represents the rates of recognition of faces of the base of expressions, described later, for the classical LDA with the distance criterion $L_2$ between vectors of the projected images (squares), and with the distance criterion $L_2$-moyCl given by the distance $L_2$ between the vector of the projected image to be recognized and the mean vector of the images of one and the same class (triangles)

FIG. 12 gives the recognition rates of the classical LDA. The distances tested are the distance $L_2$ and the distance $L_2$moyCl. The model is constructed by a PCA+LDA processing with 200 principal components. The number of principal components to be retained has been determined in the same way as previously. The best recognition rate (60.7%) is achieved for the distance $L_2$ moyCl with 60 discriminating components of 19500 pixels each. The best recognition rate for the distance $L_2$ (57.5%) is achieved with 30 discriminating components of 19500 pixels each.

Figure 13:
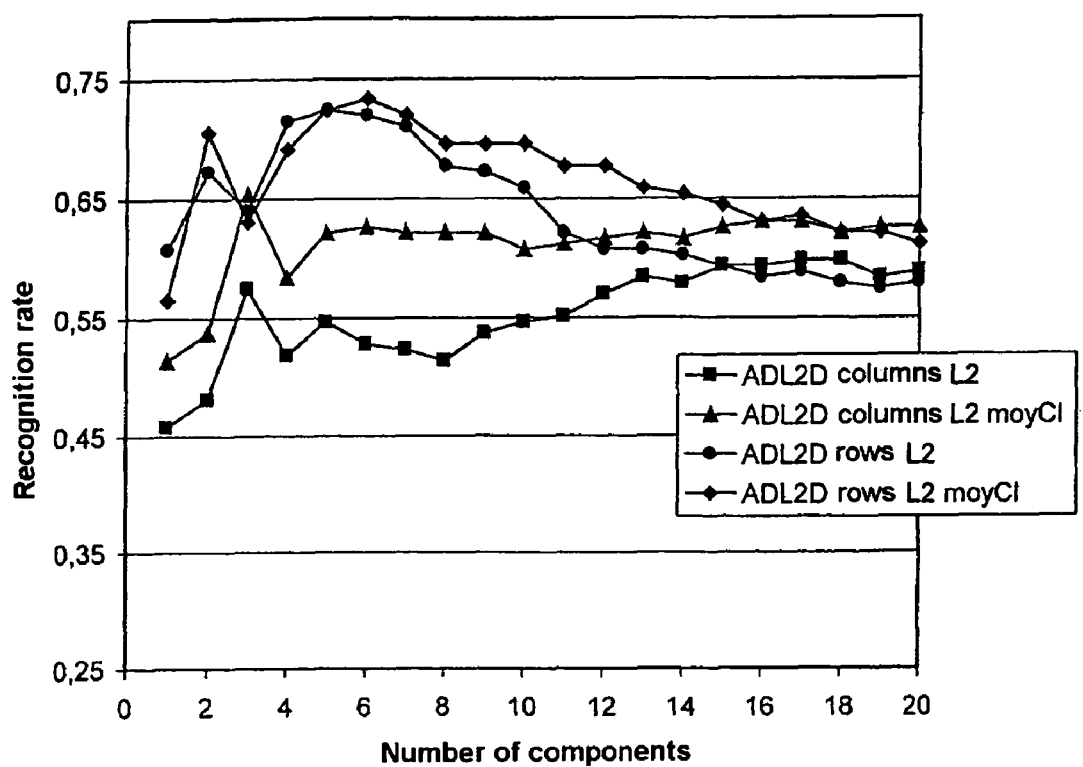
FIG. 13 represents the rates of recognition of faces of the base of expressions, with the use of the method within the sense of the invention, for:
  the LDA2D-columns, with as distance criterion, the distance $L_2$ (squares) given by relation (16) hereinabove,
  the LDA2D-columns, with as distance criterion, the distance $L_2$-moyCl (triangles) given by relation (24) hereinbelow,
  the LDA2D rows, with as distance criterion, the distance $L_2$ (disks) given by relation (16) hereinabove,
  the LDA2D rows, with as distance criterion, the distance $L_2$-moyCl (diamonds) given by relation (24) hereinbelow.

FIG. 13 gives the recognition rates of the LDA2D rows and columns with distances $L_2$ and $L_2$ moyCl. It is noticeable that, unlike the results obtained on the base intended for testing the robustness to changes of pose, the LDA2D rows here gives better results than the LDA2D columns.

It is noticeable especially that the LDA2D rows gives a very different classification from the LDA2D columns. In particular, the errors of these two procedures are not systematically made on the same images. Even in the case of errors made by the two procedures on one and the same image, the identity assigned is not systematically the same. The bases of 2D-rows and 2D-columns discriminating components therefore appear to be very different. However, the two procedures offer good results on the two bases tested. As indicated hereinabove, an optional merging and/or cross-checking of the results obtained by the two procedures LDA2D-rows and LDA2D-columns may be provided for.

Comparison of FIGS. 12 and 13 shows, as previously, that the LDA2D makes it possible to obtain better results than the classical LDA with a much lower number of components. The best recognition rates are obtained for 30 discriminating components for the classical LDA, against 6 for the LDA2D-rows, whilst the components for the LDA2D-rows are of much lesser size (150<<19500).

Figure 14:
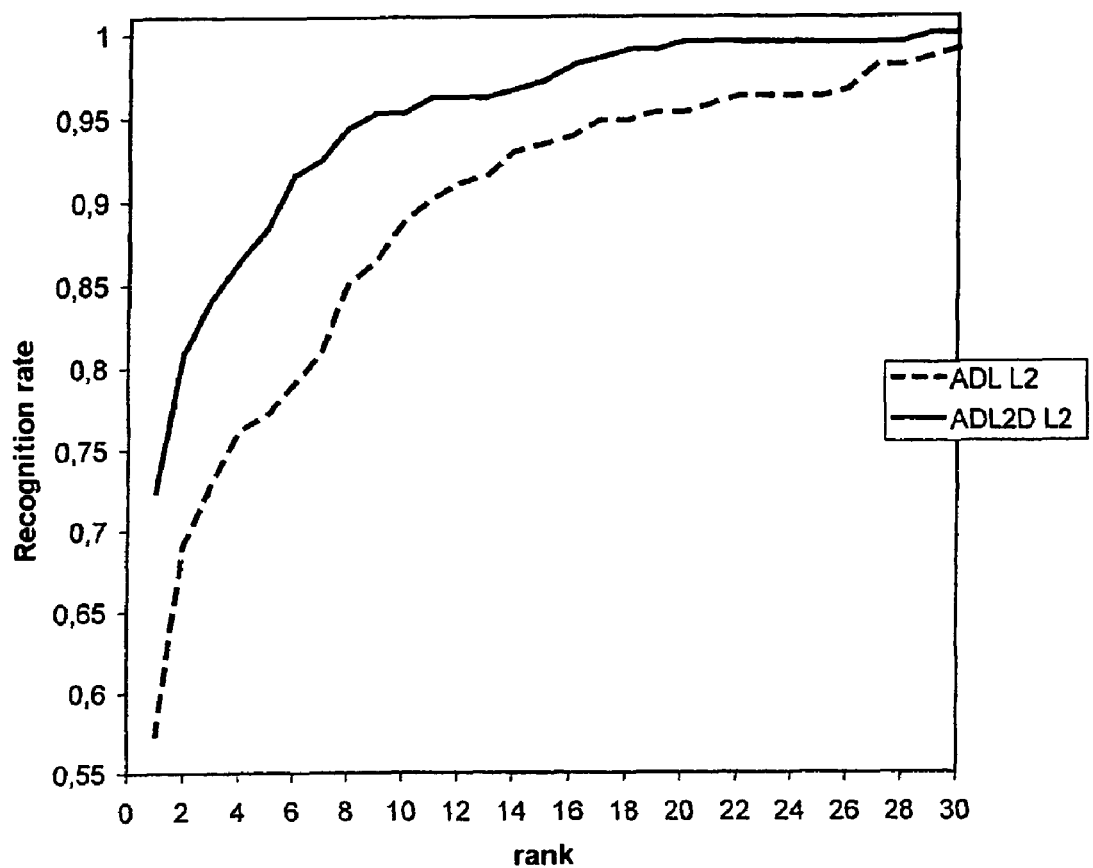
FIG. 14 represents compared CMC variations of the classical LDA (dashes) for a usual distance criterion $L_2$ between vectors of the projected images and of the LDA2D within the sense of the invention (solid lines) for a distance criterion $L_2$ given by relation (16) hereinabove and for the base of expressions.

FIG. 14 gives compared CMC variations of the classical LDA and of the LDA2D. The CMC variations are constructed with 5 components of 150 pixels each for the LDA2D rows and 30 discriminating components of 19500 pixels each for the LDA. It is seen here that the recognition rates obtained by the LDA2D rows is better not only at rank 1 but also at higher ranks. At low ranks, it is noticeable that the LDA2D performs much better than the classical LDA. The recognition rate is indeed greater by 11.95% on average over the first seven ranks.

FIGS. 12, 13 and 14 show that the LDA2D gives better results on the base of expressions than the classical LDA, both at the first rank (comparison of FIGS. 12 and 13), and also at higher ranks (FIG. 14). The LDA2D is more robust to changes of facial expressions than the classical LDA.

Figure 15:
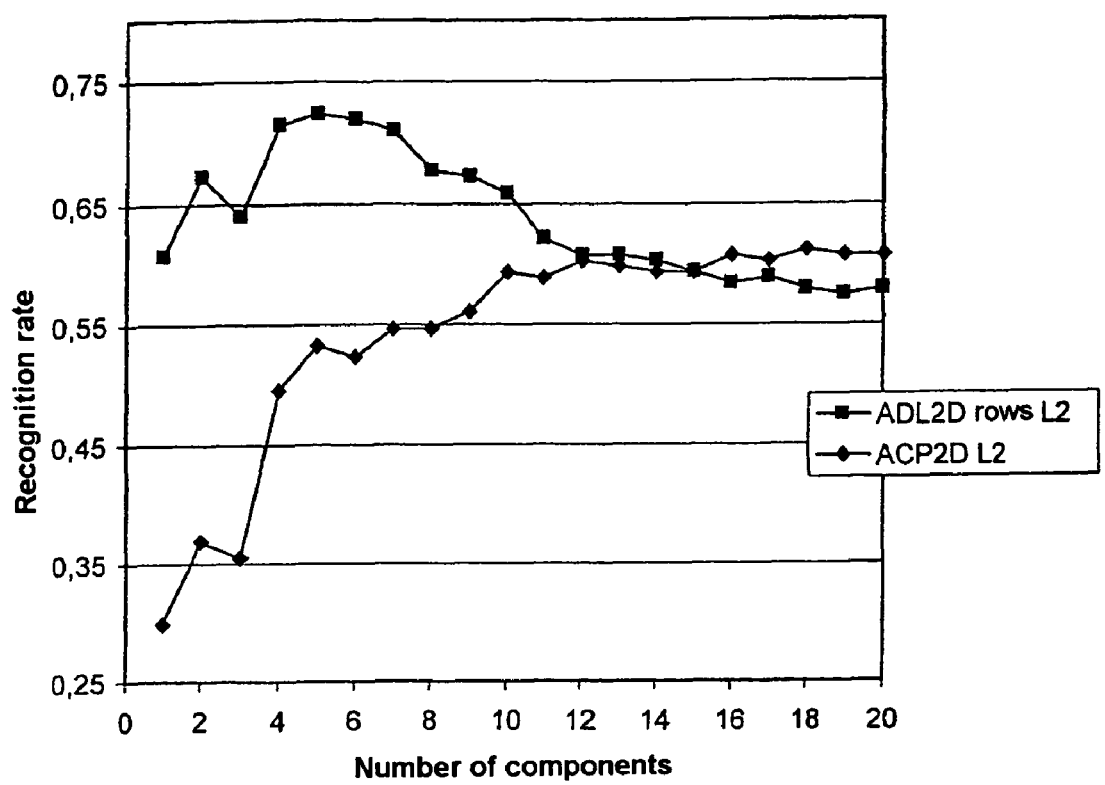
FIG. 15 represents rates of recognition of faces of the base of expressions, for the LDA2D-rows (squares) and the PCA2D (diamonds) of the prior art, with as distance criterion, the distance $L_2$ given by relation (16) hereinabove.

The results of the LDA2D and of the PCA2D of the prior art are now compared. FIG. 15 gives the compared recognition rates of the LDA2D and of the PCA2D as a function of the number of components retained, with a classification by distance $L_2$. For any fixed number of components k ranging from 1 to 11, the LDA2D-rows gives better results than the PCA2D. The best recognition rate of the PCA2D (61.2%) is achieved for 18 components. Globally, the LDA2D-rows gives far better results with fewer components. The improvement in performance (up to 19.7% of deviation with 6 components) as well as the lower number of components required largely compensates for the fact that the 2D-rows discriminating components comprise 150 pixels whereas the components of the PCA2D feature only 130 pixels.

Figure 16:
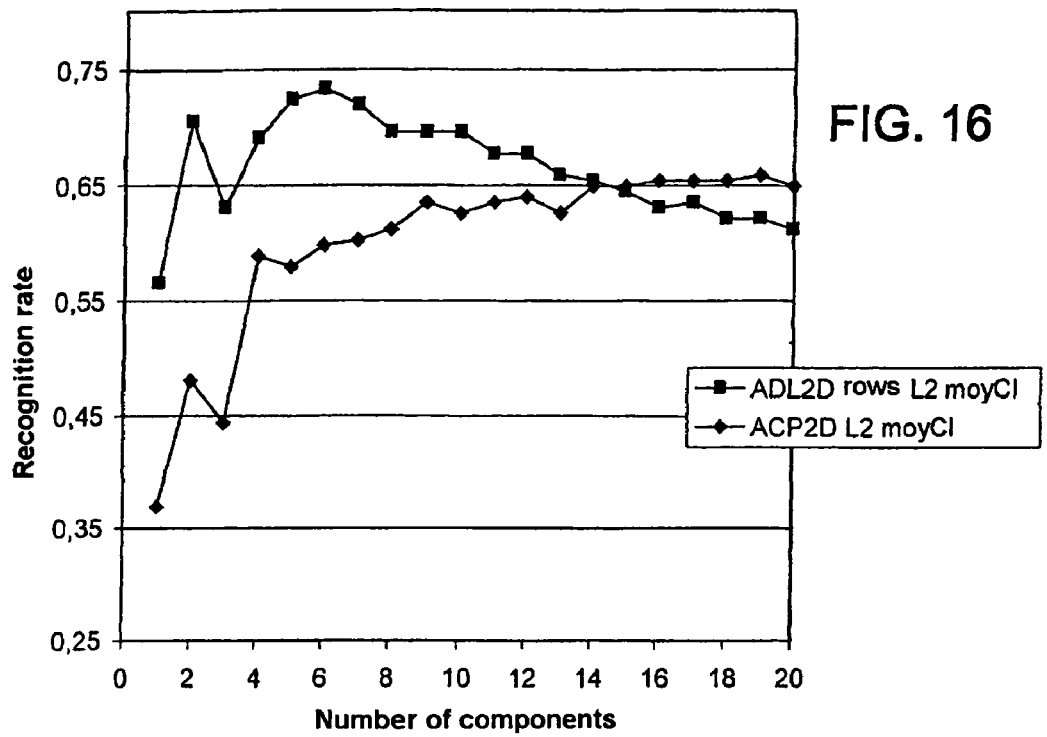
FIG. 16 represents the rates of recognition of faces of the base of expressions, for the LDA2D-rows (squares) and the PCA2D (diamonds) of the prior art, with as distance criterion, the distance $L_2$-moyCl given by relation (24) hereinafter.

FIG. 16 gives the compared recognition rates of the LDA2D and of the PCA2D as a function of the number of components retained, with a classification by distance $L_2$ moyCl. For a fixed number of components k ranging from 1 to 15, the LDA2D rows gives far better results than the PCA2D. The best recognition rate of the PCA2D (65.9%) is achieved for 19 components. Globally, the LDA2D rows gives far better results with fewer components. The recognition rate of 73.4% is achieved with only 6 components. The improvement in the performance and the lower number of components required largely compensates for the fact that the 2D-rows discriminating components comprise 150 pixels whereas the components of the PCA2D feature only 130 pixels.

Figure 17:
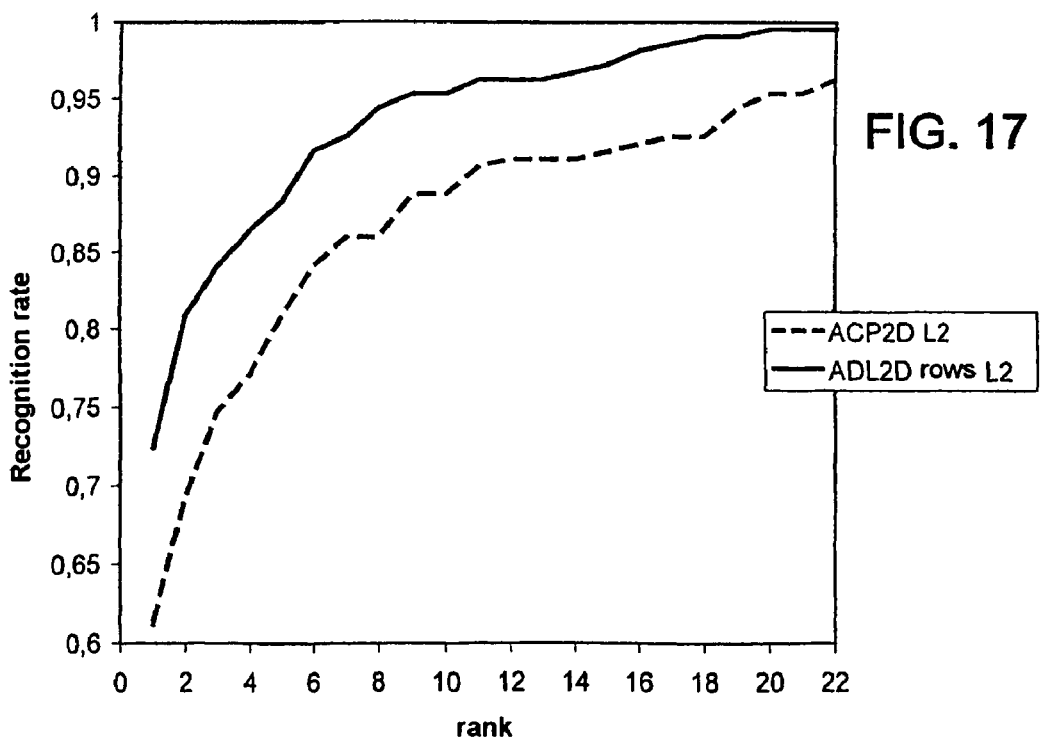
FIG. 17 represents compared CMC variations of the PCA2D of the prior art (dashes) and of the LDA2D-rows within the sense of the invention (solid lines) for a distance criterion $L_2$ given by relation (16) hereinabove and for the base of expressions.

FIG. 17 gives the compared CMC variations of the LDA2D rows $L_2$ and of the PCA2D $L_2$. The CMC variation of the LDA2D-rows is constructed with 5 2D-rows discriminating components. The CMC variation of the PCA2D is constructed with 18 components. For low ranks, the LDA2D-rows affords a great improvement with respect to the results of the PCA2D (on average 11.4% of improvement at the first two ranks).

FIGS. 15, 16 and 17 show that the LDA2D gives better recognition rates than the PCA2D, both at rank 1 for the same number of components retained ranging from 1 to 15 (FIGS. 15 and 16) and for higher ranks (FIG. 17).

Figure 18:
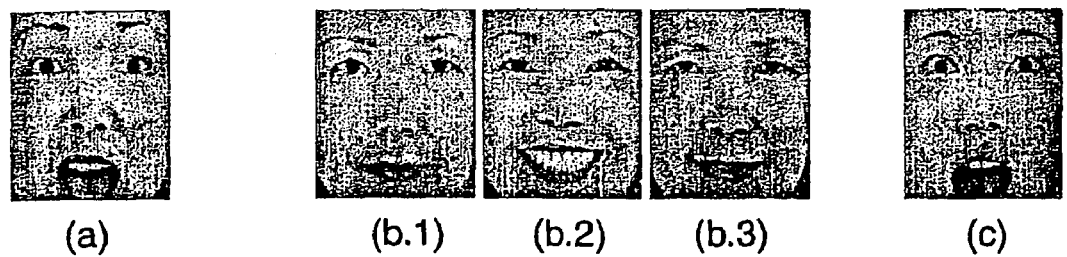
FIG. 18 represents an exemplary classification of an image (a) of a face:
  by the PCA2D of the prior art (image (c)),
  by the LDA2D-rows within the sense of the invention (image (b.1)), two other images of the learning base (b.2) and (b.3) being represented furthermore.

We now refer to FIG. 18 to describe a concrete example of classification. The PCA2D, with 18 components (offering the best recognition rates) and a distance $L_2$, poorly classes the face represented in FIG. 18(a). The three images of the learning base corresponding to this same person are represented in FIGS. 18(b.1), 18(b.2) and 18(b.3). Instead of one of these three faces, the PCA2D gives the face represented in FIG. 18(c) as being the nearest to the image of the face to be recognized.

These two people are different but bear the same facial expression however. The LDA2D-rows with 5 components, for its part, assigns the image of the face given in FIG. 18(b.1) to the test face image given in FIG. 18(a). The face is therefore well recognized by the LDA2D.

Other tests have shown that in the framework of the PCA2D with 18 components, this type of error occurs 63 times out of 93 errors in all (214 faces in the base of tests). Errors of this type therefore represent 67.74% of the classification errors made by the PCA2D. There remain just 30 errors which are not due to a separation as a function of facial expression.

Within the framework of the LDA2D rows and with 5 components, this type of error occurs 31 times out of 59 errors in all (214 faces in the test base). Errors of this type therefore represent only 52.54% of the classification errors made by the LDA2D, i.e. 25.20% fewer than the PCA2D. There remain 28 errors which are not due to a separation as a function of facial expression. The number of residual errors (which are not due to this confusion between facial expression and identity) is therefore substantially the same as for the PCA2D. It can therefore be considered that the best recognition rate of the LDA2D (11.2% of improvement with respect to the PCA2D) stems directly from the reduction in errors of this type that are due to facial expressions.

The PCA2D therefore appears to be overly influenced by the intra-class variations, with respect to the LDA2D within the sense of the invention. In the PCA2D which maximizes the total covariance without distinguishing the inter-class covariance from the intra-class covariance, the groupings of images into subspaces would be performed not as a function of identity, but of facial expression, this leading to poor separation of the classes.

The LDA2D, jointly performing the minimization of the intra-class variance and the maximization of the inter-class variance, is therefore more robust to changes of facial expressions than the PCA2D.

Figure 19:
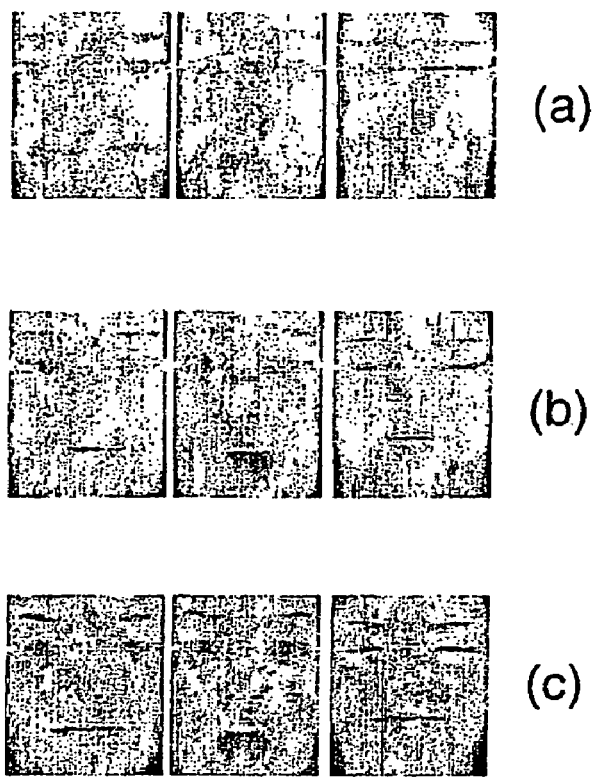
FIG. 19 represents a reconstruction within the sense of the invention of the images of the base of expressions of FIG. 4(a), with:
  three 2D-columns discriminating components (19(a)),
  four 2D-columns discriminating components (19(b)), and
  twenty 2D-columns discriminating components (19(c)), and FIG. 20 diagrammatically represents a device such as a computer workstation for the implementation of the method within the sense of the present invention.

Represented in FIG. 19 are the reconstructions of the images shown in FIG. 4. With the fourth component, the facial features are apparent (eyes, nose, mouth). With more components (typically 20 components or more), one can expect a visually satisfactory reconstruction of the initial faces.

Thus, the bidimensional LDA, offering satisfactory classification by a reduction of dimensions, allies the discriminating power of the classical LDA and the saving in calculations of the PCA2D. Furthermore, with respect to these two procedures, the LDA2D is more robust to changes of pose and of facial expressions which are two major issues in face recognition.

Figure 20:
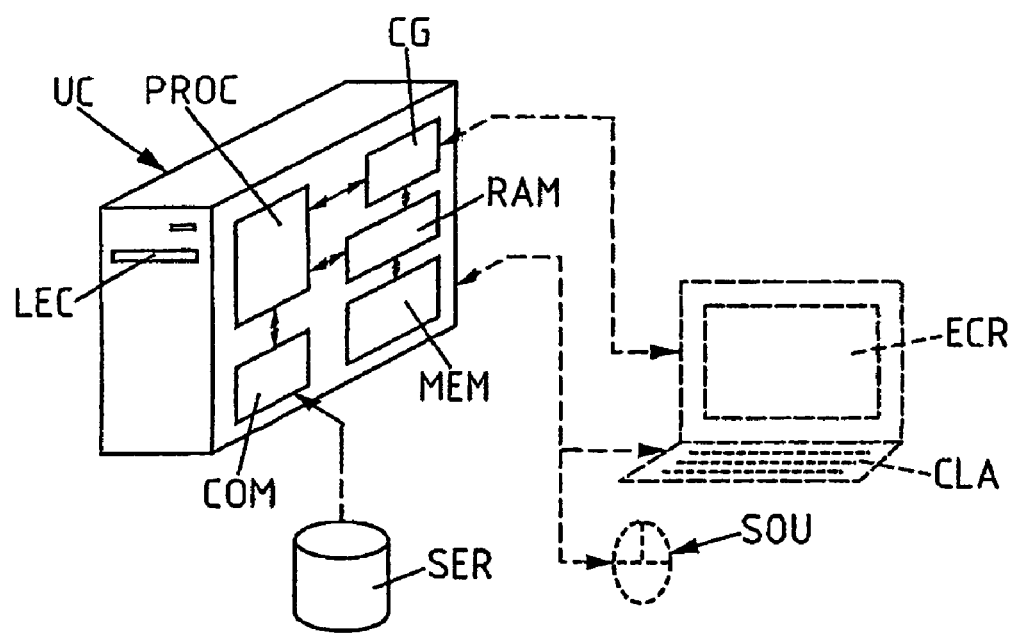

Represented in FIG. 20 is a computer device for the implementation of the present invention, equipped for example with display means such as a screen ECR, with input facilities (keypad CLA, mouse SOU, or the like), with a central unit UC furnished with a processor PROC, with a random access memory RAM, with a read only memory MEM, with a graphics card CG linked to the display means ECR, and with means of communication COM (such as a modem) for example with a server SER, via a communication network (for example the Internet network), so as to receive, as appropriate, images of faces to be recognized and/or to transmit reconstructed images.

It is indicated in particular that the memory MEM of the device is devised to store at least:

the images of one or more learning bases, in the form of digital data, and the instructions of a computer program product for the implementation of all or some of the steps of the method within the sense of the invention, whilst the processor PROC is capable of cooperating with this memory MEM so as to process the images of the learning base and/or reference images, as well as images to be recognized and to be compared thereafter with the images of the learning base and/or with the reference images.

As a variant, the device comprises a reader LEC of a removable memory medium (CD-ROM, ZIP, USB stick, or the like) able to store the program product and/or the learning base.

The invention claimed is:

1. A method of recognizing faces in digital images, by statistical processing, in which there is provided (11) a learning base (BA) containing images of faces, this learning base being hierarchized as a plurality of classes each comprising different pictures of one and the same person, characterized in that said images are represented by matrices whose coefficients are values of pixels; and in that the method comprises:
a preprocessing of the learning base, in which:
a matrix system representative of a variance between different classes (15) and of the inverse of a variance in each of the classes (14) is formed from said matrices, and
a vector base (17) comprising discriminating components of said learning base is determined from said matrix system, aiming jointly at a minimization of the variance in each of the classes and a maximization of the variance between different classes; and further comprises:
a subsequent classification processing of an image of a face to be recognized, comprising the following steps:
an identification matrix is constructed (18) comprising vectors obtained by projecting the image of the face to be recognized onto said vector base,
a reference matrix is constructed comprising vectors obtained by projecting a reference image onto said vector base,
the identification matrix is compared (19) with the reference matrix, according to a chosen distance criterion.

2. The method as claimed in claim 1, characterized in that the preprocessing of the learning base comprises the following steps:
estimation of a mean face of all the faces of the learning base (12);
estimation of a mean face (13) for each of the classes ($CL_i$);
computation of (14, 15):
a first matrix, of intra-class covariance, corresponding to the mean of the matrices of the square deviation between each image of the learning base and the mean face of its class, and
a second matrix, of interclass covariance, corresponding to the mean of the matrices of the square deviation between the mean face of each class and the mean face of the learning base;
determination of the eigensystem (SYS) of a matrix product formed by the multiplication of the second matrix by the inverse of the first matrix (16);
and selection of eigenvectors (EIGEN(V)) of said eigensystem (17) as discriminating components of the learning base.

3. The method as claimed in claim 2, characterized in that the eigenvectors associated with a chosen number of largest eigenvalues are selected.

4. The method as claimed in one of the preceding claims, characterized in that said values of pixels of the bidimensional matrices correspond to grey levels.

5. The method as claimed in claim 1, characterized in that it comprises a prior step (LDA2D-lines) to the formation of said matrix system and consisting in applying a transposition of the matrices representing the images of the learning base.

6. The method as claimed in claim 1, wherein the preprocessing of the learning base comprises the following steps:
estimation of a mean face of all the faces of the learning base (12);
estimation of a mean face (13) for each of the classes ($CL_i$);
computation of (14, 15):
a first matrix, of intra-class covariance, corresponding to the mean of the matrices of the square deviation between each image of the learning base and the mean face of its class, and
a second matrix, of interclass covariance, corresponding to the mean of the matrices of the square deviation between the mean face of each class and the mean face of the learning base;
determination of the eigensystem (SYS) of a matrix product formed by the multiplication of the second matrix by the inverse of the first matrix (16); and
selection of eigenvectors (EIGEN(V)) of said eigensystem (17) as discriminating components of the learning base; and
wherein said projection is performed by multiplying the matrix associated with the face to be recognized and/or the matrix associated with a reference face, by each of the selected eigenvectors.

7. The method as claimed in claim 1, characterized in that the distance criterion comprises the evaluation of a sum of the distances ($L_2$) between the corresponding columns of the identification and reference matrices.

8. The method as claimed in claim 7, characterized in that said (d) distance is evaluated from the relation:

$$d(\hat{X}_i, \hat{X}_t) = \sum_{j=1}^{k} \|\hat{X}_i^j - \hat{X}_t^j\|^2 \sum_{j=1}^{k} \sqrt{\left(\hat{X}_i^j - \hat{X}_t^j\right)^T \left(\hat{X}_i^j - \hat{X}_t^j\right)}.$$

where:
$\hat{X}_t$ is the identification matrix resulting from the projection,
$\hat{X}_i$ is the reference matrix resulting from the projection,
the designation $(M)^T$ denotes the transpose of the matrix M,
k signifies a number of discriminating components retained,
and the designation $\hat{X}_i^j = X_i P^j$ denotes the projection of a matrix $X_i$ onto the discriminating component $P^j$ of the vector base.

9. The method as claimed in claim 1, characterized in that the distance criterion is fixed between the identification matrix and the projected mean of each class of the learning base, in the guise of reference matrix.

10. The method as claimed in claim 9, characterized in that said distance is given by the relation:

$$d(c, \hat{X}_t) = \sum_{j=1}^{k} \sqrt{\left(\overline{\hat{X}}^{c,j} - \hat{X}_t^j\right)^T \left(\overline{\hat{X}}^{c,j} - \hat{X}_t^j\right)}$$

where the designation $\hat{X}_t^j = X_t P^j$ denotes the projection of a matrix $X_t$ onto the discriminating component $P^j$ of the vector base, and $$\overline{\hat{X}}^{c,j} = \frac{1}{n_c}\sum_{i \in c} \hat{X}_i^j$$

is a mean vector of size m.

11. The method as claimed in claim 1, characterized in that the reference image is obtained from the learning base.

12. The method as claimed in claim 1, characterized in that it comprises a step (20) of reconstructing the images of faces, after a compression of the image data by reduction of dimension.

13. The method as claimed in claim 12, characterized in that the reconstruction $X'_i$ of an image $X'_i$ is given by the relation:

$$X'_i = PP^T X_i = P\hat{X}_i^T$$

where the designation $\hat{X}_i = X_i P$ denotes the projection of the matrix $X_i$ onto the vector base represented by the matrix P and the designation $P^T$ denotes the transpose of the matrix P.

14. The method as claimed in claim 12, further comprising a prior step (LDA2D-lines) to the formation of said matrix system and consisting in applying a transposition of the matrices representing the images of the learning base, wherein the reconstruction $X'_i$ of an image $X'_i$ is given by the relation:

$$X'_i = PP^T X_i = P\hat{X}_i^T$$

where the designation $\hat{X}_i = X_i P$ denotes the projection of the matrix $X_i$ onto the vector base represented by the matrix $P^T$ and the designation $P^T$ denotes the transpose of the matrix P.

* * * * *